United States Patent [19]
Naoi et al.

[11] Patent Number: 4,734,549
[45] Date of Patent: Mar. 29, 1988

[54] TOUCH SENSOR

[75] Inventors: Suguru Naoi, Tokyo, Japan; Minoru Akagawa, Hayward, Calif.; Hiromi Tsuda, Chiba, Japan

[73] Assignees: Rin Ei Seiki Kabushiki Kaisha, Tokyo, Japan; Intelmatec Corporation, Haywood, Calif.

[21] Appl. No.: 934,001

[22] Filed: Nov. 24, 1986

[30] Foreign Application Priority Data

Nov. 25, 1985 [JP] Japan .......................... 60-179985[U]
Nov. 25, 1985 [JP] Japan .......................... 60-179986[U]

[51] Int. Cl.⁴ ............................................... H01H 3/16
[52] U.S. Cl. .................................................. 200/61.41
[58] Field of Search ........................ 200/61.22–61.25, 200/61.41, 61.42, 61.44, 61.5

[56] References Cited

U.S. PATENT DOCUMENTS

| | | | |
|---|---|---|---|
| 2,176,770 | 10/1939 | Maught | 200/61.5 |
| 2,452,296 | 10/1948 | Eslinger et al. | 200/61.23 |
| 2,778,896 | 1/1957 | Tollefsen | 200/61.5 |
| 2,882,362 | 4/1959 | Carter | 200/61.24 |
| 3,229,059 | 1/1966 | Beatty | 200/61.41 |
| 3,703,617 | 11/1972 | Burnett | 200/61.5 |
| 4,159,429 | 6/1979 | Migliardi et al. | 200/61.42 X |
| 4,301,338 | 11/1981 | McMurtry | 200/61.42 X |
| 4,461,936 | 7/1984 | Kimura et al. | 200/61.41 |
| 4,498,043 | 2/1985 | Heathcote | 200/DIG. 1 X |

Primary Examiner—J. R. Scott
Attorney, Agent, or Firm—Moonray Kojima

[57] ABSTRACT

A position detecting device for detecting the position of an object from any angle comprising a contacting member having a ball center portion held within a spherical bearing to enable multiple angle movement and an inner end contacting a switch, whereby any movement of the contacting member at any angle operates the switch. In a second embodiment, the ball and bearing arrangement is replaced with an arc portion and inner surface of the support body with the length dimension in the width diameter being maintained the same for any movement of the contacting member. The device is advantageous in enabling detection at any angle with a small, lightweight device.

2 Claims, 4 Drawing Figures

U.S. Patent  Mar. 29, 1988  4,734,549
FIG_1
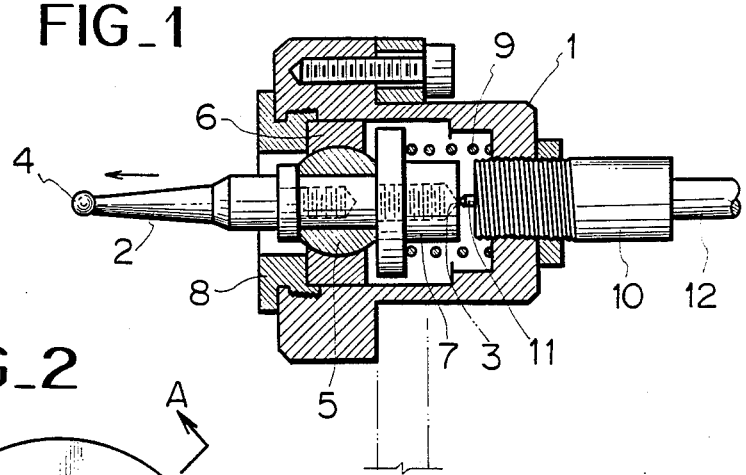
FIG_2
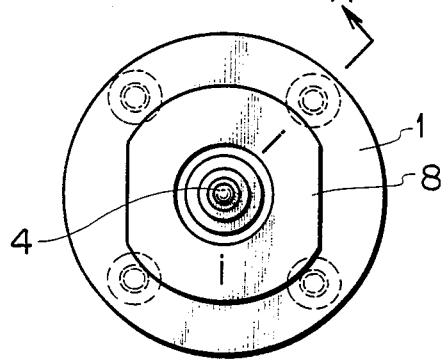
FIG_3
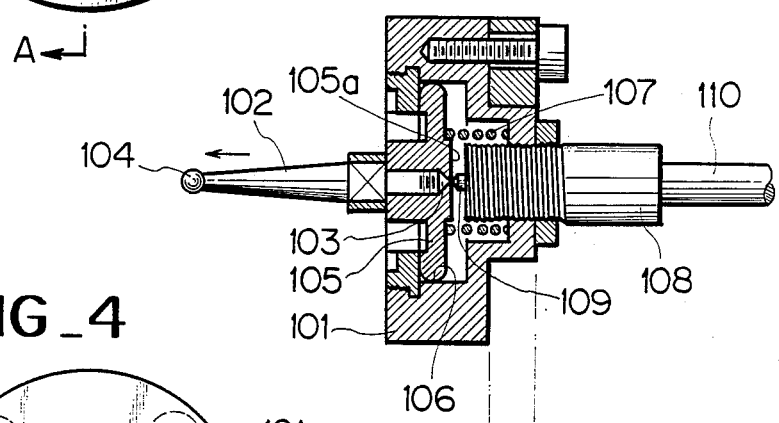
FIG_4
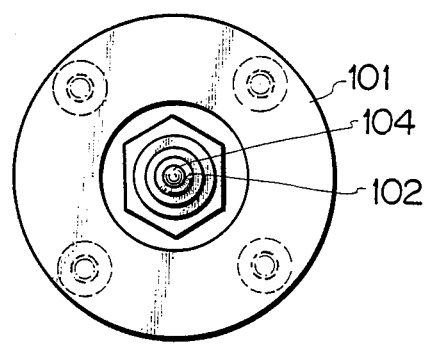

TOUCH SENSOR

BACKGROUND OF THE INVENTION

1. Field of Invention.

This invention relates to a touch sensor for detecting the position of an object, such as parts of a machine tool, robot, and the like.

2. Discussion of the Prior Art.

There are many different kinds and types of detecting sensors. However, the conventional sensors are restricted in the angles at which the sensing is carried out, so that multiple angle detecting is difficult, repetitive and inefficient.

SUMMARY OF THE INVENTION

Accordingly, an object of the invention is to overcome the aforementioned and other deficiencies and disadvantages of the prior art.

Another object is to enable touching detecting at a plurality of angles with a simple device.

The aforementioned and other objects are attained by the invention which encompasses an instrument wherein a contacting member comprises a spherical portion held rotatably in a bearing to enable rotative motion of the contact member and a switch which is in contact with the contacting member and is operable for every movement of the contacting member. In a second embodiment, the spherical portion and bearing arrangement is replaced by an arc shaped part held with the support body without any spherical bearing. The spherical portion and arc part of the contact members enable the contacting members to move in a multiplicity of angles with each angular movement operating the contacting switch.

BRIEF DESCRIPTION OF DRAWINGS

FIG. 1 is a vertical cross sectional view depicting a first illustrative embodiment of the invention.

FIG. 2 is a front view of the FIG. 1 embodiment.

FIG. 3 is a vertical cross sectional view depicting a second illustrative embodiment of the invention.

FIG. 4 is a front view of the embodiment of FIG. 3.

DETAILED DESCRIPTION OF PREFERRED EMBODIMENTS

Turning now to FIGS. 1 and 2, the touching sensor comprises a support body 1 within which is contained, a touching member 2 comprising an inner touching plate 7 having an inner end 3, an outer spherically shaped touching part 4, and a spherical body 5 which is rotatably supported by a spherical bearing 6 which is fit within a support body 1; and a spring 9 for normally biasing the touching member 4 outwardly as shown by the arrow. As depicted, the touching plate 7 having inner end 3, touching member 2, and body 5 may be interconnected by bolts, or be integrally formed as one unit. A presser plate 8 is used to screwably hold bearing 6 within body 1, with touching member 2, ball 5, plate 7 and spring 9 also held within body 1, with spring 9 in a resilient position effecting force in the direction of the arrow. The touching plate 7 has a larger diameter portion for holding spring 9 and enabling the spring force to be applied to touching member 2. A switch member 10 is attached to body 1 and comprises a detecting part 11 connected to an amplifier (not shown) via a wire 12. Detecting part 11 is in contact with inner end 3.

The embodiment of FIGS. 1 and 2 operates as follows. Spring 9 continually applies a force in the direction of the arrow. Also, detecting part 11 is in contact with inner end 3. When touching member 2 moves about ball 5 held by bearing 6, it can move in an angular direction. When the touching member 2 moves, inner end 3 will move to cause movement of detecting part 11 and thus operate switch 10. Any movement, in any direction or angle, of touching member 2 will thus move detecting part 11 and operate the switch 10. The ball and bearing arrangement enables the movement in any angular direction of touching member 2. The spherical end 4, advantageously, also enables detecting of an object from any different angle.

Turning to the embodiment of FIGS. 3 and 4, the touching sensor of the second embodiment comprises a support body 101 within which is contained a touching member 102 comprising a central portion 105 comprising an arc portion 106, an inner end contacting part 105a in contact with detecting part 109 of switch 108, and an outer end spherical portion 104; a presser plate (not numbered) holding the central part 105 within support body 101 against the resilience of spring 107; and a switch member 108 comprising a detecting part 109 and a wire 110 for connecting to an amplifier (not shown). Spring 107 exerts a force in the direction of the arrow. The touching member 102 is shown connected to central portion 105 by a bolt 103, but, touching member 102 and central part 105 may be formed integrally as one unit.

The difference between the first and second embodiments is that the second embodiment has an arc portion 106 replacing ball 5 and bearing 6 with the arc portion 106 movably positioned within the inner surface of support body 101. The movement is in any direction. The operation is substantially the same, but, the second embodiment enjoys a further advantage in that the length in the width direction remains substantially the same, so that the motion is stable and thus detection can be carried out substantially exactly even with angular movements.

Thus, according to the invention, the spherical outer touching part (4,104)/which is provided at the outer end of the touching member (2,102) is rotated or moved back and forth about the rotation of the spherical body (5,6 ; 106) and moves the detecting part (11,109) of switch member (10,108) to operate switch member (10,108), so that stable, exact detection is carried out at any angle of movement of the touching member (4,104). Advantageously, the invention can detect positions in the X,Y,Z directions and for inside and outside positions, and do so with a light-weight and small sized device.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A touch sensor capable of detecting movement in any one of three dimensions comprising
   a support body;
   a spherical bearing held within said support body;
   an elongated straight touching member comprising an outer end spherical shaped contact portion, a spherical shaped body portion movably held by said bearing, an inner end portion, and means for connecting said outer end portion, said body portion, and said inner end portion in a straight line;

spring means for normally biasing said touching member in a direction away from a detecting member; and a switch means comprising a switch and said member normally in contact with said inner end portion of said touching member and movable in a direction away from said touching member to operate said switch for any movement of said touching member; wherein said inner end portion comprises a flat planar circular shaped surface of a sufficient diameter and positioned to always be be in contact with said detecting member and wherein said detecting member is elongated and is positioned to be perpendicular to said planar surface of said inner end portion.

2. A touch sensor capable of detecting movement in any one of three dimensions comprising a support body;

an elongated straight touching member comprising an outer end spherical shaped contact portion, an inner end portion and an arc shaped portion held within said support body;

spring means for normally biasing said touching member in a direction away from a detecting member; and said detecting member in contact with said inner end portion of said touching member and movable in a direction away from said touching member to operate a switch for any movement of said touching member; wherein said inner end portion comprises a flat planar circular shaped surface of a sufficient diameter and positioned to always be in contact with said detecting member and wherein said detecting member is elongated and is positioned to be perpendicular to said planar surface of said inner end portion.

* * * * *